United States Patent Office 3,557,447
Patented Jan. 26, 1971

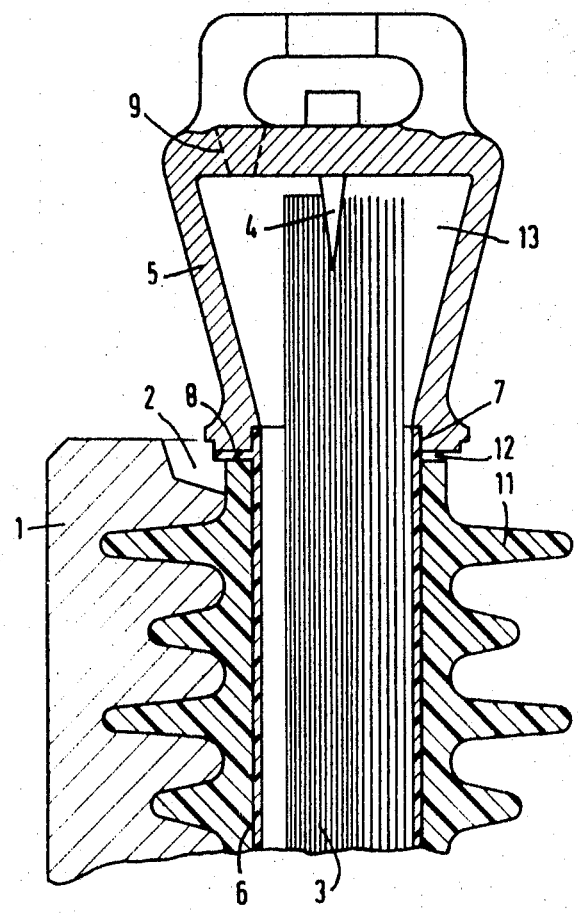

3,557,447
METHOD OF PRODUCING AN INSULATOR OF GLASS FIBER REINFORCED CAST RESIN
Wolfgang Gruber, Lichtenfels, and Günter Steger, Burgkunstadt, Germany, assignors to Siemens Aktiengesellschaft, a corporation of Germany
Filed Nov. 4, 1968, Ser. No. 773,081
Claims priority, application Germany, Nov. 3, 1967, 1,690,082
Int. Cl. H01b 19/02
U.S. Cl. 29—631
6 Claims

ABSTRACT OF THE DISCLOSURE

Described is a method of producing an insulator of glass fiber reinforced cast resin. A prestressed glass fiber cord, which had been pretreated with an epoxide resin mixture and located in the interior chamber of a form is fixed therein at the caps and is expanded with the same epoxide resin hardener mixture. To produce a mantel, a filler-containing casting resin which is resistant to creep current, to electric arc and to atmospheric air is cast around the cords and heat hardened.

---

It is known that insulating bodies of high mechanical stability may be produced from glass fiber reinforced cast resins. To this end, glass fibers which are formed into loops or rods and compounded with resinous plastic are embedded in a preferably filler-containing, casting resin.

However, the insulator bodies thus produced have many disadvantages. The stability of the glass fibers reinforcement is not fully utilized by the deflection of the glass fibers. Breaks occur within the bonding area of the glass fibers. It is particularly disturbing that a delamination of the glass fiber bond takes place even before the breaking load is reached. These and other faults which occur impair the operational reliability of the known insulating bodies.

It is an object of our invention to devise a method which permits the production of glass fiber reinforced electrical insulating bodies, which does not entail the aforementioned disadvantages and which makes it possible to stress the insulators not only for pulling but also for breaking.

The single figure shows in partial section, an insulator made in accordance with the present invention.

In the drawing, a prestressed glass fiber cord 3, previously treated with a mixture of epoxide resin hardener and situated in a form 1, is attached to a cap 5. The glass fiber cord in the interior hollow space of the form 1 is expanded with the same mixture of epoxide resin hardener and for the purpose of producing a jacket comprising a trunk and branches (skirt) 11 is cast in a vacuum, with a filler-containing casting resin which is resistant to open air and to creep currents, and electric arcs.

During the liquid phase, when the resin hardener mixture is added, the prestressed glass fiber rod expands but maintains the assumed direction of the glass fibers. The already impregnated glass fibers are well wetted by the mixture of resin hardeners. Furthermore, because of the opening or swelling, the glass fibers are not closely adjacent, thus diminishing the danger of an electrical breakdown.

By using the method of the invention, the stability of the glass fiber reinforcement which is <50% with respect to the cross section of the core (without the enclosing casting) is almost fully utilized. The method provides for a rational manufacture. The thus produced insulating devices, e.g. the long-rod insulators, mast girders and supports can be stressed not only for pulling but also for breakdown. No breakdowns occur within the armatures at the loop in the deflection of the glass fiber. No delaminations occur in the reinforced glass fiber cross section before the breaking load is reached.

The share of glass fibers may vary between 15% and 40%, preferably 20%, with respect to the core cross section. They may be present in the form of conventional glass fiber rovings.

To bind the glass fiber rovings and to expand the glass fiber cord, we use, in accordance with the invention, mixtures of epoxide resin hardeners which have no filler, more particularly bisphenol A based epoxide resins. The use of hard resins is particularly preferred. In some cases cycloaliphatic epoxide resins are the most favorable.

For the production of the jackets respectively of the skirts, we preferably use resins which are creep current resistant or arc resistant and resistant to fresh air, and in particular use cycloaliphatic epoxide resins, together with known fillers, such as quartz meal, aluminumoxytrihydrate, calcium carbonate, dolomite, calcium sulfate and mixtures thereof.

For a further illustration of the invention and to show the progress derived therefrom, we refer to an embodiment example while making further reference to the drawing.

The drawing shows an insulator in longitudinal section. The left side shows the build-up according to the method and the right side shows the insulator. The glass fiber rovings are run through a wetting chamber which contains, as a wetting agent, a bisphenol A based epoxide resin (epoxide numbers about 0.25) and phthalic acid anhydride as a hardener. The rovings are drawn through a nozzle. The continuous method produces long cords which are cut to size when used. The prestressed and bound cords are firm at room temperature without hardening.

The prestressed glass fiber cords 3, bound by the epoxide resin mixture and possessing a diameter of 12 mm. and a glass fiber share of approximately 70%, are installed into a divided cast form 1 which has a feeder 2 and are fixed and held by the point 4. The point is usually located in the cap 5. The caps of the insulator may be comprised of high quality gray iron, or malleable cast iron.

An insulating foil 6 is prefabricated in the shape of a cylinder and attached through recesses 7 to the cap 5. The foil may be comprised e.g. of polycarbonate, preferably terephthalic acid ester. A divided sealing ring and spacing ring 8 form a component of the cast form 1. The ring provides for maintaining a distance of the cap 5 from the subsequent jacket 11 and conversely for a separation of the cast mass of the jacket 11 from the cap 5.

The glass fiber rod 3 installed into form 1 and fixed by the point 4, is then cast-enclosed and expanded through the feeder opening 9 in the cap 5, by the same epoxide resin hardener mixture.

At the same time a filler-containing, cycloaliphatic epoxide resin is cast, through the feeder 2 for the purpose of forming the trunk and the skirts or branches 11. The subsequent moisture protection, i.e. the insulating foil cylinder 6, comprised of terephthalic acid ester, acts as a separating wall and prevents a blending of the reaction resin mass. The casting is effected under vacuum and the hardening by heating.

During the liquid phase and the vacuum process, the glass fiber bond expands (see right side of the drawing).

The epoxide resins being used are hardened simultaneously, resulting in a good binding.

The divided sealing and spacing rings 8 are to be removed following deformation. The space 12 is sealed by means of a sealing. As the sealing which is to be placed between the cast enclosure 11 and the cap 5 at the locality 12, we prefer a seal comprised of polytetrafluoroethylene, silicon rubber and elasticised, cold-hardened cast resin.

We claim:

1. A method of producing an insulator of a glass fiber reinforced cast resin which comprises fixing a prestressed glass fiber cord, which had been pretreated with an epoxide resin hardener mixture, at the ends of an interior chamber of a form and expanding the glass fiber cord with the same epoxide resin hardener mixture to produce a jacket by cast enclosing the same in a filler-containing casting resin which is resistant to creep current, electric arc and to the atmosphere and thereafter hardening by heat.

2. The method of claim 1, wherein the glass fiber rod is expanded to four times its original volume.

3. The method of claim 1 wherein the expanding and the cast enclosing are effected simultaneously.

4. The method of claim 3, wherein the inside chamber is bordered by a foil of terephthalic acid ester.

5. The method of claim 3, wherein a bisphenol A based epoxide resin is used for treating and for expanding the glass fibers.

6. The method of claim 5, wherein a filler-containing epoxide resin hardener mixture on a base of cycloaliphatic epoxide resins is used for the production of the jacket.

References Cited

UNITED STATES PATENTS 3,134,164  5/1964  Hocks _____ 29—631
3,226,805  1/1966  Scott et al. _____ 29—631

TRAVIS S. McGEHEE, Primary Examiner